Figure 1:
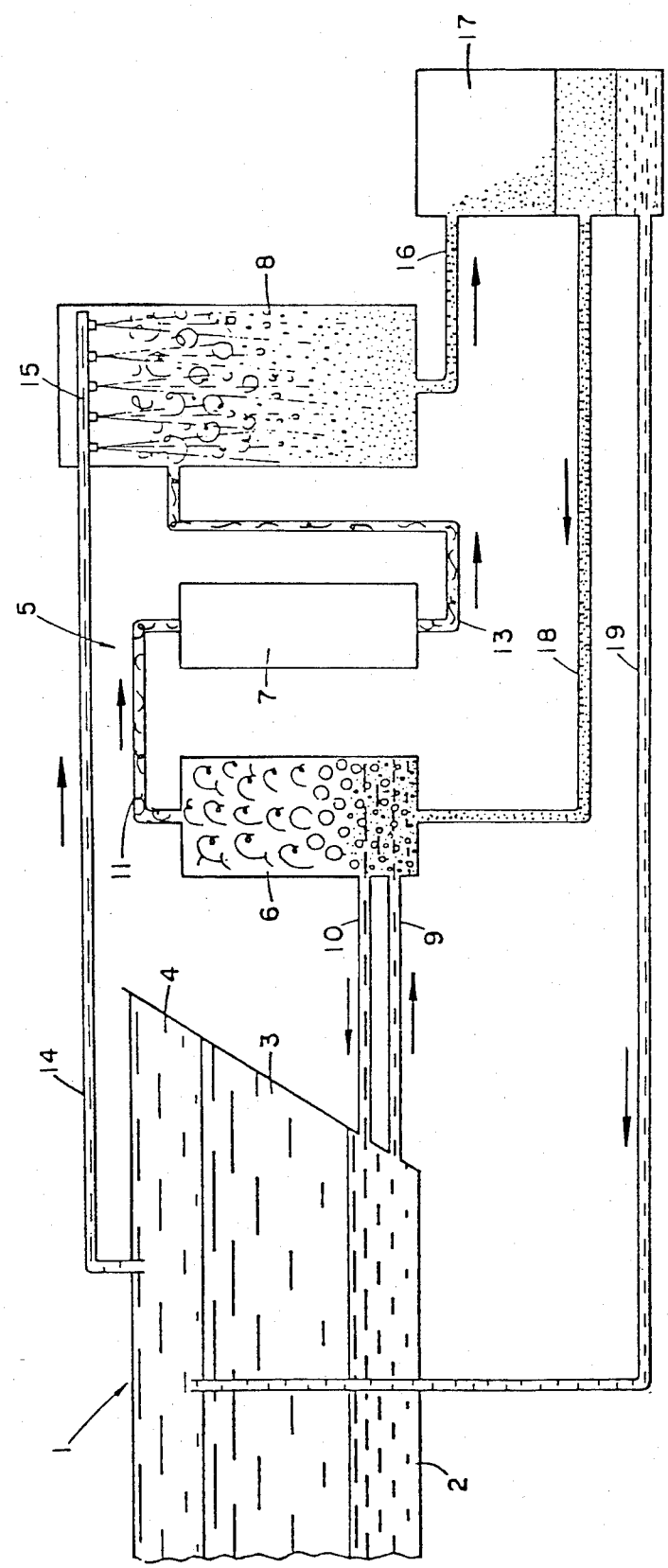

United States Patent [19]

Assaf et al.

[11] Patent Number: 4,498,300

[45] Date of Patent: Feb. 12, 1985

[54] DUAL PURPOSE SOLAR POND FOR EVAPORATION AND HEAT STORAGE

[75] Inventors: Gad Assaf, Rehovot; Benjamin Doron, Jerusalem, both of Israel

[73] Assignee: Solmat Systems, Ltd., Yavne, Israel

[21] Appl. No.: 453,938

[22] Filed: Dec. 28, 1982

[51] Int. Cl.³ ................................................ F03G 7/02
[52] U.S. Cl. .................................... 60/641.8; 126/415
[58] Field of Search .......................... 60/641.8, 641.9; 126/415, 416

[56] References Cited

U.S. PATENT DOCUMENTS

| | | | |
|---|---|---|---|
| 3,928,145 | 12/1975 | Othmer | 60/641.9 |
| 4,244,351 | 1/1981 | Loeb et al. | 126/415 |
| 4,370,860 | 2/1983 | Assaf | 60/641.8 |
| 4,377,071 | 3/1983 | Assaf et al. | 60/641.8 |
| 4,408,459 | 10/1983 | Yogev | 60/641.8 |

OTHER PUBLICATIONS

Proceedings of the 16th Intersociety Energy Conversion Engineering Conference, Atlanta, Georgia, U.S.A., 9/14/81, pp. 2221-2226, "Solar Energy Research Institute", by Johnson, Leboeuf, and Waddington.
Gad Assaf, "The Dead Sea: A Scheme for a Solar Lake", Solar Energy, vol. 18, (Pergamon Press, 1976), pp. 293-299.
H. Tabor, "Solar Ponds", Solar Energy, vol. 27, No. 3, (Pergamon Press, 1981), pp. 181-184.

*Primary Examiner*—Allen M. Ostrager
*Attorney, Agent, or Firm*—Sandler & Greenblum

[57] ABSTRACT

A solar pond serving the dual purposes of concentrating an aqueous brine by evaporation and simultaneously producing power by storage of incident solar radiation. The so-stored solar energy is used by a heat machine. The solar pond has a concentrated aqueous brine which serves as the heat storage layer, and a halocline overlying the heat storage layer. An evaporation layer, whose density does not exceed that of the upper stratum of the halocline, overlies the halocline. A heat exchanger forms a part of a heat machine, and includes an organic, water-emiscible operating fluid as heat carrier, means for withdrawing hot brine from the heat storage layer to the heat exchanger, means for returning brine from the heat exchanger to the heat storage layer, a condenser for the operating fluid adapted for the throughflow of an aqueous coolant as heat sink, and means for feeding a warmed coolant emerging from the condenser to the evaporation layer.

3 Claims, 2 Drawing Figures

DUAL PURPOSE SOLAR POND FOR EVAPORATION AND HEAT STORAGE

The present invention concerns a dual purpose pond serving at the same time for the concentration of aqueous brines and as so-called solar pond.

In many industrial operations such as, for example, the recovery of potassium chloride from Dead Sea water, aqueous brines are subjected to evaporation in open evaporation ponds by the action of the impinging solar energy. some 97% of the impinging solar energy is collected by an open body of brine and is converted into heat which is emitted to the atmosphere as latent heat of evaporation, sensible heat and long wave radiation. The rate of evaporation, i.e., the rate of dissipation of heat from the pond as latent heat of evaporation, depends on the partial vapor pressure and this in turn decreases with concentration. For example, taking native water from the Dead Sea in Israel whose density is about 1.23 g/ml and subjecting it to evaporation in an open, shallow evaporation pond, the rate of evaporation will be about 2 m/year and such evaporation consumes about 75% of the incident solar radiation out of the 97% that is collected. With the evaporation the concentration and density of the brine increase and when the density reaches about 1.29 g/ml the rate of evaporation drops to about 1 m/year with the utilization of 37% of the impinging solar energy only.

It is thus seen that as the concentration of the brine increases the rate of evaporation and therefore the rate of dissipation of heat in the form of latent heat of evaporation decreases, with the consequence that the pond heats up.

The capacity of concentrated aqueous brines to absorb and store a large proportion of the incident solar radiation is utilized for the construction of so-called solar ponds. Broadly speaking, a solar pond comprises a so-called halocline which is a body of water whose concentration and density increase from top to bottom, which halocline overlies a heat storing layer of brine whose concentration and density is equal to that of the lowermost stratum of the halocline. If desired, the bottom and side walls of such a solar pond may be lined or coated with a black, radiation absorbing material but this is not essential. Because of the capacity of a solar pond to absorb and store a high proportion of the incident solar radiation in the form of sensible heat, such a pond is not useful as an evaporation pond.

The heat stored in a solar pond can be utilized, among others, for the production of electric or mechanical energy. For this purpose the pond is associated with a power generating unit comprising a heat exchanger for the withdrawal of heat from the heat storage layer, a turbine based unit for the generation of electric or mechanical energy and, as a rule, also a condenser. Such a power generating unit associated with a solar pond will be referred to in the following specification and claims as "heat machine".

It has already been proposed to use in a heat machine an organic operating fluid as heat carrier and a direct heat exchanger in which such fluid is contacted directly with hot brine withdrawn from the heat storing layer, the organic fluid being water immiscible and inert to the brine.

The direct heat exchange is effected outside the pond and thereafter the hot working fluid is separated from the somewhat cooled brine and the latter is returned to the pond. After separation the back-flowing brine and/or the hot working fluid may be utilized for driving the turbine.

In accordance with one such known method, the hot working fluid is caused to expand through a turbine thereby producing the desired mechanical or electric power while the heat depleted brine is returned directly to the pond.

By another known method, the so-called binary lift method described, for example, in our U.S. patent application Ser. No. 155,971 of June 3, 1980, the liquid operating fluid is injected into a vertically oriented lift tube whose lower end communicates with the heat storage layer. The injected operating fluid takes up heat from the brine and begins to boil and in consequence a mixture of the brine and boiling operating fluid rises inside the lift tube. At the end of the rise the vaporous operating fluid is separated from the liquid brine and the latter is returned by gravity flow to the pond operating on its way to the turbine, while the operating fluid is condensed and recycled.

In all known heat machines the enthalpy of evaporation of the operating fluid (latent heat of evaporation and sensible heat) is dissipated to an extraneous heat sink and is lost.

It is thus seen that the prior art teaches on the one hand the concentration of aqueous brines by evaporation in open evaporation ponds by means of solar energy without utilization of any of the incident solar energy other than for the evaporation, and on the other hand the utilization of solar energy for power production by means of solar ponds with associated heat machines with loss of all the heat rejected by the latter. It is the object of the present invention to improve the performance of both an evaporation pond and a solar pond by a judicious combination of both.

In accordance with the present invention there is provided a dual purpose solar pond installation for the concentration of an aqueous brine by evaporation and the simultaneous production of power by storage of incident solar radiation and utilization of the so-stored energy by means of a heat machine, comprising a concentrated aqueous brine serving as heat storage layer, a halocline overlying the heat storage layer, an evaporation layer overlying the halocline and whose density does not exceed that of the upper stratum of said halocline, a heat exchanger forming part of a heat machine and comprising an organic, water immiscible operating fluid as heat carrier, means for withdrawing hot brine from said heat storage layer to said heat exchanger, means for returning brine from said heat exchanger to said heat storage layer, a condenser for said operating adapted for the throughflow of an aqueous coolant as heat sink, and means for feeding a warm coolant emerging from said condenser to said evaporation layer.

The invention further provides a method for the concentration of an aqueous brine by evaporation and the simultaneous production power by means of solar energy, comprising producing a pond having a stratified body of aqueous brine comprising a concentrated heat storage layer, a halocline overlying said heat storage layer, an evaporation layer overlying said halocline and whose concentration does not exceed that of the uppermost stratum of the halocline, installing a heat machine in association with the pond, withdrawing hot brine from said heat storage layer into the heat exchanger of said heat machine thereby to operate the latter, returning heat depleted brine to said heat storage layer and feeding warm coolant from the condenser of the heat machine to said evaporation layer.

In a preferred embodiment of the invention the heat machine comprises a direct heat exchanger.

It is thus seen that in accordance with the invention the enthalpy given off by the operating fluid during condensation is fed into the evaporation layer and serves as an additional heat source for the evaporation whereby the rate of evaporation is increased. In this way the thermodynamic efficiency of the dual purpose evaporation-power production solar pond according to the invention is significantly higher than of either a solar pond or an evaporation pond of equal surface area.

In the course of evaporation care must be taken that the concentration of the evaporation layer does not exceed that of the upper stratum of the halocline. In accordance with one embodiment of the invention this is achieved by withdrawing the evaporation layer when the density has reached a predetermined value and replacing it by a new layer. In accordance with another embodiment of the invention brine from the evaporation layer is constantly withdrawn from one end of the evaporation layer and a corresponding amount of fresh brine is constantly fed in at an opposite end thereof.

In accordance with one embodiment of the invention the heat storage layer and all the strata of the halocline are saturated at the temperature there prevailing. This has the advantage that where in the course of evaporation some solute precipitates out of the evaporation layer the precipitating solute sinks to the bottom of the pond without upsetting the concentration regime inside the halocline.

Any precipitate that accumulates at the bottom of the solar pond may be withdrawn therefrom continuously or intermittently by any suitable method known per se.

The invention is applicable to advantage, for example, in the recovery of potassium chloride potash from the Dead Sea. In native Dead Sea brine the concentration of potassium chloride is 14 g/liter while there are present 100 g/liter of sodium chloride, 170 g/liter of magnesium chloride and some 40 g/liter of calcium chloride. Before the KCl can be extracted, the NaCl must be precipitated and for this purpose large evaporation ponds are conventionally used. In these ponds the Dead Sea brine is evaporated and concentrated from an initial density of 1.23 g/ml to a density of 1.29 g/ml and during this concentration the NaCl precipitates.

From the salt precipitation pond the brine of 1.29 g/ml density is pumped into another precipitation pond in which the brine is further concentrated to a density of 1.34 g/ml and in the course of that further concentration the potassium chloride precipitates in the form of the double salt carnilite. The remaining raffinate, the so-called end-brine of density of 1.34 g/ml contains mostly $MgCl_2$ and $CaCl_2$ and this end-brine is rejected and returned to the Dead Sea.

In accordance with the invention the dual purpose pond may be used for example for the first stage of salt precipitation. To this end the upper, evaporation layer will comprise brine of a density varying from 1.2 to 1.29, the halocline will have a concentration gradient from 1.32 at the top to 1.37 at the bottom and the heat storing layer will have a density of 1.37. Such a concentrated brine is readily available by further concentration of the end brine from a density of 1.34 to 1.37 g/ml.

In such a dual purpose pond about 15–20% of the incident solar radiation is collected and stored as heat, the thermal head, i.e., the temperature difference between the hot brine in the heat storing layer and the organic operating fluid being about 50°–60° C. A heat machine may convert about 7% of this heat to useful work, i.e, about 1–1.5% of the total incident radiation. The heat rejected by the heat machine is returned to the pond surface and serves as additional heat input for the evaporation process. In consequence, 98.5–99% of the total incident solar radiation is consumed by the evaporation layer as compared to 80% only in case of an ordinary solar pond which rejected the heat to a cooling tower or another heat sink other than the pond surface.

In a preferred embodiment of the invention coolant for the condenser is withdrawn from the evaporation layer and thus flows in a closed circuit from the evaporation layer via the condenser of the heat machine back into the evaporation layer, continuously carrying on its way heat from the operating fluid to the evaporation layer.

Figure 2:
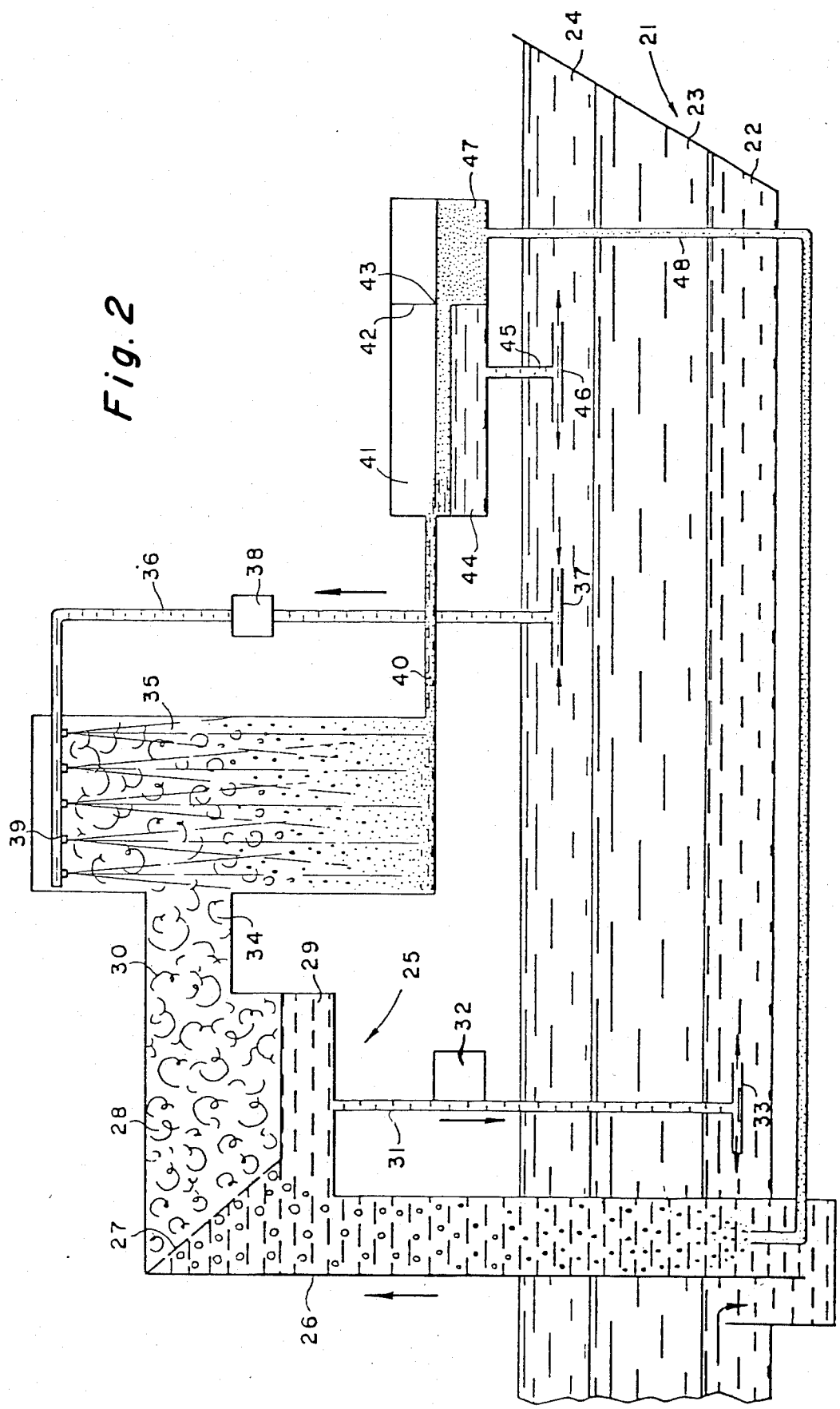

The invention is illustrated, by way of example only, in the accompanying drawings in which:

FIG. 1 is a diagrammatic illustration of one embodiment of a dual purpose solar pond according to the invention; and FIG. 2 is a diagrammatic illustration of another embodiment.

The installation shown in FIG. 1 comprises a dual purpose solar pond 1 having a heat storage layer 2, a halocline 3 and an evaporation layer 4. The installation further comprises a heat machine 5 comprising a direct heat exchanger 6, a turbine based power generating unit 7, and a condenser 8. A pipe 9 serves for the withdrawal of hot brine from the heat storage layer 2 to the heat exchanger 6 and a pipe 10 serves for the return of heat-depleted brine from the heat exchanger 6 to the heat storage layer 2 of pond 1. A pipe 11 serves for feeding hot vapor of the operating fluid from the heat exchanger 6 to the power generating unit 7 and a pipe 12 conducts the expanded vapor from unit 7 to condenser 8. A pipe 14 serves for withdrawing brine from evaporation layer 4 into a operating fluid and brine into a separator 17. A pipe 18 is adapted to return liquid operating fluid from separator 17 to heat exchanger 6 while a second pipe 19 serves for returning brine from separator 17 to the evaporation layer 4.

During operation hot brine is withdrawn via pipe 9 into the direct heat exchanger 6 where it is contacted with liquid operating fluid arriving via pipe 18. By this contact the operating fluid takes up heat from the brine and is evaporated and the heat-depleted brine is returned via pipe 10 into the heat storage layer 2 of pond 1. The pressurized operating fluid vapor generated inside the heat exchanger 6 is fed into the power generating unit 7 where it expands via the turbine thereof thereby generating electric or mechanical power. The expanded vapor is flown via pipe 13 into the condenser 8 where it is contacted with brine arriving from evaporation layer 4 of pond 1 via pipe 14 and sprayed into the condenser by means of spraying device 15. In consequence of the contact between the sprayed brine and the vapor the latter is condensed and a mixture of liquid operating fluid and brine is withdrawn by pipe 16 into separator 17 where it is stratified. From the upper layer the liquid operating fluid is withdrawn via pipe 18 and returned into condenser 6 while from the lower layer brine is withdrawn and returned into evaporation layer 4 via pipe 19 which thus takes up all the enthalpy of condensation given off by the operating fluid inside condenser 8.

In the embodiment of FIG. 2 the heat machine comprises a binary lift. As shown a dual purpose solar pond 21 comprises a heat storage layer 22, a halocline 23 and an evaporation layer 24. The heat machine 25 comprises here a vertical lift tube 26 whose lower part communicates with the heat storage layer 22 while its upper part merges via a net 27 into a phase separator 28 comprising a sump 29 for the brine and an upper space 30 for the vapor.

A vertical pipe 31 leads from sump 29 via a turbine based power generating unit 32 into the heat storage layer 22 and comprises a T-shaped discharge end 33.

From vapor space 30 a passage 34 leads into a direct contact condenser 35 and is adapted to conduct the vapor from space 30 into condenser 35. A pipe 36 having a T-shaped lower intake end 37 and which is fitted with a pump 38 leads to a spraying device 39 inside condenser 35 and is thus adapted to inject into the condenser brine from evaporation layer 24, to serve as coolant.

A pipe 40 connects the lower part of condenser 35 with a separator 41. Separator 41 comprises a partition 42 with an opening 43, the lower part of partition 42 forming together with the walls of the separator a trap 44 for the brine. From trap 44 a vertical pipe 45 fitted with a T-shaped discharge end 46 leads back into the evaporation layer 24.

On the righthand side (with reference to FIG. 2) of the separator 41 there is formed a trap 47 for the liquid operating fluid and a pipe 48 leads from that trap to the lower, intake end of the lift tube 26.

During operation, operating fluid is continuously injected into the lower part of lift tube 26 via pipe 47 and by contact with the hot brine is brought to boil in consequence of which a mixture of operating fluid and hot brine is lifted inside the lift tube 26 up to the phase separator 28, passing on its way through net 27. In the phase separator 28 the liquid brine settled in sump 29 and from there drops by gravity via pipe 31 operating on its way the turbine of the power generating unit 32. The brine emerging from the exhaust side of the turbine in power generating unit 32 is returned into the heat storage layer 22 in a horizontal flow via discharge end 33 and in this way the stratification inside the pond is not upset.

The operating fluid vapors accumulating in the upper part of the separator 28 are conducted via passage 34 into the direct contact condenser 35 where they are brought in contact with brine from the evaporation layer 24 arriving via duct 36 and spraying device 39. There results a two phase liquid mixture of operating fluid and brine which is conducted via pipe 40 into the separator 41 where the brine collects inside brine trap 44 while the operating fluid collects inside trap 47. The brine from trap 44 is returned via pipe 45 and discharge end 46 into evaporation layer 24 and again due to the horizontal flow of the discharge brine the stratification is not upset. The operation fluid is returned from trap 47 via pipe 48 into the lift tube 26.

Similar as in the previous embodiment the brine accumulating in trap 44 and returned to the evaporation layer via pipe 45 brings with it the entire enthalpy of condensation which it picked up in condenser 35 where it had served as coolant.

We claim:

1. A method for using a solar pond power plant comprising a salt water solar pond that includes an upper convective layer on which solar radiation is incident, a non-convective halocline having a downwardly directed density gradient below the convective layer, and a heat storage layer below the halocline, and having a heat machine that includes a vaporizer and a condenser for generating power, said method comprising:
   (a) exchanging brine between the heat storage layer and the vaporizer of the heat machine for generating power;
   (b) exchanging brine between the convective layer and the condenser for adding heat to the convective layer thereby increasing the rate of evaporation therefrom and increasing the salinity thereof; and
   (c) periodically withdrawing brine from the convective layer to an evaporation pond where the brine is concentrated by evaporation, and replacing the withdrawn brine with make-up brine that is less dense than the withdrawn brine.

2. A method for concentrating brine in stages comprising the steps of:
   (a) providing a first stage evaporating pond in the form of a salt water solar pond comprising an upper convective layer of relatively dilute brine on which solar radiation is incident, a non-convective halocline having a downwardly directed density gradient below the convective layer, and a heat storage layer of relatively concentrated brine below the halocline;
   (b) providing a heat machine that comprises a vaporizer and a condenser;
   (c) exchanging brine between the heat storage layer and the vaporizer for generating power;
   (d) exchanging brine between the convective layer and the condenser for adding heat to the convective layer thereby increasing its temperature and the rate of evaporation therefrom and increasing the salinity of the convective layer;
   (e) providing a second stage evaporating pond; and
   (f) periodically withdrawing brine from the convective layer to the second stage evaporating pond and replacing the withdrawn brine with more dilute make-up brine.

3. In a method for concentrating brine in stages using evaporating ponds, the improvement comprising:
   (a) utilizing the upper convective layer of a salt water solar pond as a first stage in concentrating brine;
   (b) enhancing evaporation from the upper convective layer of the salt water solar pond by using brine from the convective layer to cool a condenser in a heat machine whereby the temperature of the brine in the convective layer is increased and evaporation therefrom is increased;
   (c) periodically withdrawing brine from the convective layer and directing the withdrawn brine to a conventional evaporating pond; and
   (d) replacing the brine withdrawn from the convective layer of the solar pond with less concentrated brine.

* * * * *

UNITED STATES PATENT AND TRADEMARK OFFICE
CERTIFICATE OF CORRECTION

PATENT NO. : 4,498,300
DATED : February 12, 1985
INVENTOR(S) : Gad Assaf, et al

It is certified that error appears in the above-identified patent and that said Letters Patent is hereby corrected as shown below:

On the title page the following should be inserted.

-- [30] Foreign Application Priority Data

Dec. 28, 1981 [IL] Israel ........64658

Signed and Sealed this

Sixth Day of May 1986

[SEAL]

Attest:

DONALD J. QUIGG

Attesting Officer     Commissioner of Patents and Trademarks